(12) United States Patent
Hodroj et al.

(10) Patent No.: US 10,887,243 B2
(45) Date of Patent: Jan. 5, 2021

(54) AGGREGATING MULTIPLE BANDWIDTH SOURCES

(71) Applicant: T-Mobile, USA, Inc., Bellevue, WA (US)

(72) Inventors: Samir Hodroj, Bothell, WA (US); Yasmin Karimli, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 247 days.

(21) Appl. No.: 14/979,503

(22) Filed: Dec. 27, 2015

(65) Prior Publication Data

US 2017/0187639 A1 Jun. 29, 2017

(51) Int. Cl.
| | | |
|---|---|---|
| *H04L 12/891* | (2013.01) | |
| *H04L 5/00* | (2006.01) | |
| *H04W 28/08* | (2009.01) | |
| *H04L 12/46* | (2006.01) | |
| *H04W 48/18* | (2009.01) | |
| *H04W 72/10* | (2009.01) | |
| *H04W 76/15* | (2018.01) | |

(52) U.S. Cl.
CPC ............. *H04L 47/41* (2013.01); *H04L 5/001* (2013.01); *H04L 5/0044* (2013.01); *H04L 5/0064* (2013.01); *H04W 28/08* (2013.01); *H04L 12/4641* (2013.01); *H04W 48/18* (2013.01); *H04W 72/10* (2013.01); *H04W 76/15* (2018.02)

(58) Field of Classification Search
CPC combination set(s) only.
See application file for complete search history.

(56) References Cited

U.S. PATENT DOCUMENTS

| | | | | |
|---|---|---|---|---|
| 7,907,616 B1* | 3/2011 | Breau | ..................... | H04L 45/00 370/236 |
| 2012/0044862 A1* | 2/2012 | Chen | ..................... | H04W 36/00 370/328 |
| 2012/0196644 A1* | 8/2012 | Scherzer | ............... | H04W 48/18 455/524 |
| 2014/0025804 A1* | 1/2014 | Mongazon-Cazavet | ..................... | H04L 41/0893 709/223 |
| 2014/0254518 A1* | 9/2014 | Wentink | ............ | H04W 74/0816 370/329 |
| 2014/0280706 A1* | 9/2014 | Jain | ........................ | H04L 67/06 709/217 |
| 2015/0188969 A1* | 7/2015 | Boshev | ................. | H04L 65/602 709/203 |
| 2015/0288601 A1* | 10/2015 | Jiang | ................... | H04L 12/6418 370/392 |
| 2016/0021014 A1* | 1/2016 | Wetterwald | ......... | H04L 47/2441 370/235 |

(Continued)

*Primary Examiner* — Huy D Vu
*Assistant Examiner* — Bao G Nguyen
(74) *Attorney, Agent, or Firm* — Han Santos, PLLC

(57) ABSTRACT

Techniques are disclosed for aggregating bandwidth from multiple sources. In embodiments, a user device, such as a cellular telephone, may have a communications channel established with both a cellular tower and a wireless access point (WAP). When the user device transmits data, this data transmission may be divided between the multiple communications channels concurrently, so as to utilize the combined bandwidth of the multiple channels. Each communication channel may be prioritized, such as by prioritizing using the cellular channel until it is at capacity, and then using the WAP channel.

20 Claims, 5 Drawing Sheets

(56) References Cited

U.S. PATENT DOCUMENTS

| | | | |
|---|---|---|---|
| 2016/0080235 A1* | 3/2016 | Tan | H04L 43/0888 370/235 |
| 2016/0156548 A1* | 6/2016 | Pazhyannur | H04W 28/08 370/338 |
| 2017/0048913 A1* | 2/2017 | Teyeb | H04W 48/18 |

* cited by examiner US 10,887,243 B2.

AGGREGATING MULTIPLE BANDWIDTH SOURCES

BACKGROUND

User devices, such as cellular telephones are able to transmit data from multiple network connections, such as a cellular network connection, or a Wi-Fi network connection. There are technologies that allow a user device to automatically fail over from the Wi-Fi network connection to the cellular network connection when the Wi-Fi network is providing insufficient bandwidth. Additionally, there are technologies that pair two asymmetric digital subscriber lines (ASDLs) and transmit data over them without prioritizing one connection over the other. There are many problems with the current techniques for utilizing bandwidth, some of which are well known.

BRIEF DESCRIPTION OF THE DRAWINGS

The Detailed Description is set forth with reference to the accompanying Figures.

DETAILED DESCRIPTION

Context of Aggregating Multiple Bandwidth Sources
Overview

A problem with existing techniques for utilizing bandwidth is that they fail to aggregate multiple bandwidth sources while prioritizing how these different bandwidth sources are utilized. Embodiments disclosed herein overcome this deficiency with existing techniques by prioritizing the use of multiple data connections that are aggregated to provide increased bandwidth to a computing device.

Figure 1:
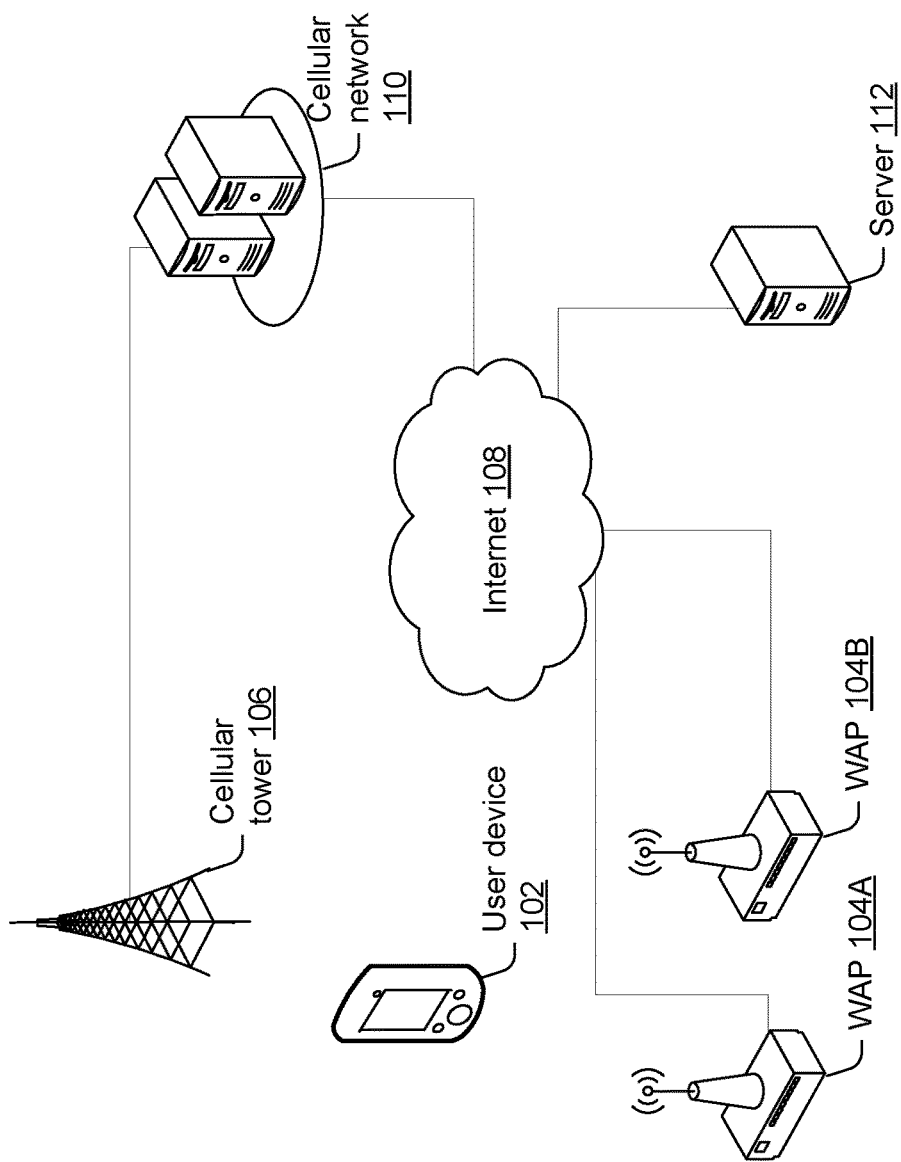
FIG. 1 is a top-level diagram of aggregating multiple bandwidth sources.

FIG. 1 is a top-level diagram of aggregating multiple bandwidth sources. As depicted, user device may be a computing device, such as a cellular telephone, or a laptop. User device 102 is within communicative range of three wireless networks—those of cellular tower 106, and wireless access points (WAPs) 104A and 104B. User device 102 may aggregate the bandwidth provided by two or more of these multiple data connections to achieve more bandwidth as compared to utilizing the bandwidth of a single one of these data connections.

WAPs 104 and cellular tower 106 may connect to other computing devices through Internet 108. For example, they may connect to cellular network 110—one or more computing devices maintained by an operator of cellular tower 106 that are used to provide cellular telephone and/or data service, or to server 112, which is a computing device separate from cellular network 110.

In general, a cellular connection may be considered to be a communications protocol that utilizes licensed spectrum, and a WAP with a Wi-Fi connection may be considered to be using a communications protocol that utilizes unlicensed spectrum. Licensed spectrum covers long distance, high power radiation emitters, which may include cellular base stations on standards such as Code Division Multiple Access 2000 ("CDMA2000"), Wideband Code Division Multiple Access ("W-CDMA"), High Speed Packet Access Plus ("HSPA+"), and Long Term Evolution ("LTE") base stations. For purposes of this patent application, licensed spectrum refers to any EMF that relates to frequencies whose use is amenable to long distance and/or high power radiation emission, as to be regulated by license by a government.

In contrast, relatively short distance/low power radiation emitters, have less risk of interfering with other user devices. While still regulated, these EMF frequencies are typically not subject to license. For example, in the United States, the Federal Communications Commission ("FCC") regulates unlicensed spectrum via Title 47 of the Code of Federal Regulations, Part 15 ("47 CFR 15").

Unlicensed emitters, include Wi-Fi, Bluetooth, cordless phones, and frequency modulation ("FM") bands for used for low-distance coverage encompassing a single business locale, a residence, or shorter. Also contemplated are transmitters which may have longer range capability but whose focus limits diffusion and therefore limits the potential to interfere with other communications. An example may include laser based communications where the laser intensity is sufficiently low not to cause health hazards. For purposes of this patent application, unlicensed spectrum refers to any EMF that relates to frequencies whose use is amenable to low-distance and/or low power radiation emission, as not to be regulated by license by a government.

Exemplary Hardware, Software and Communications Environment

Figure 2:
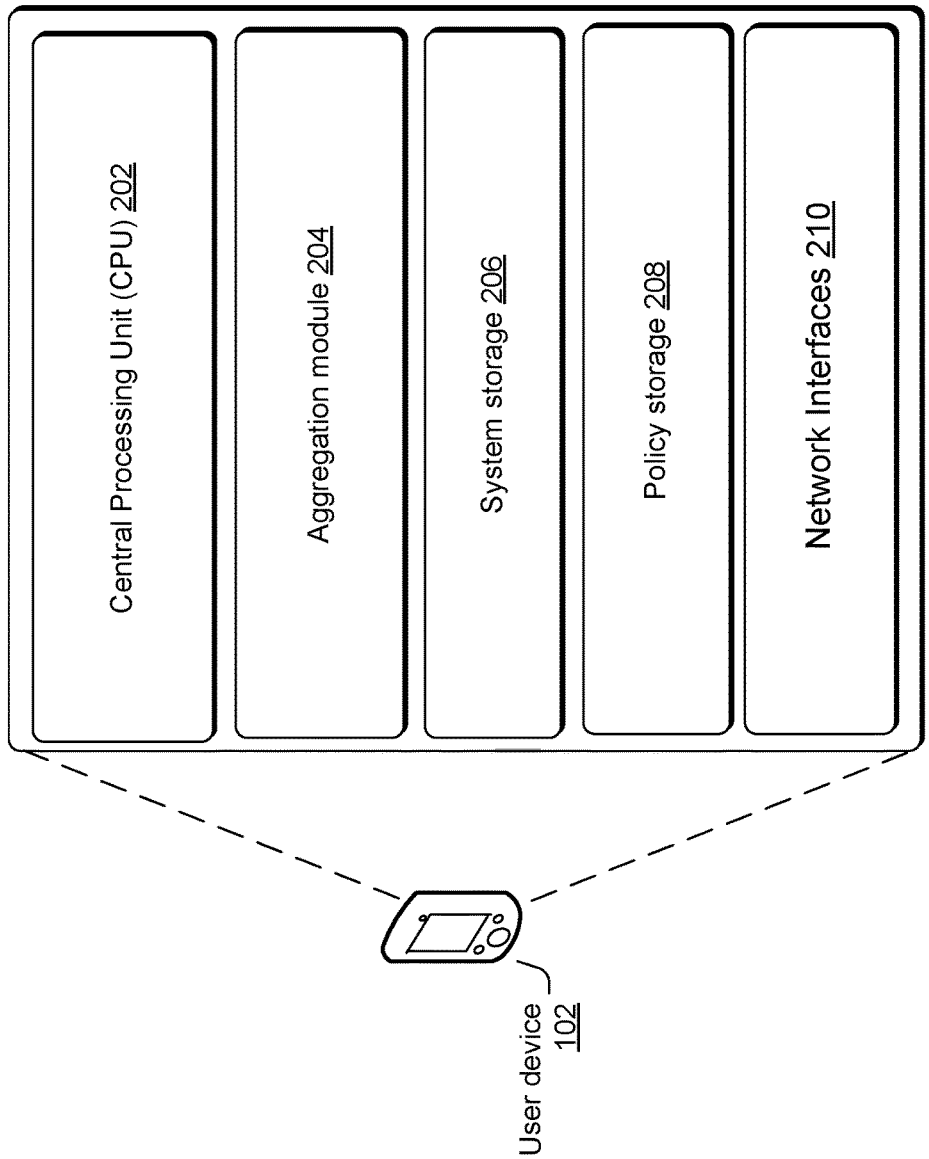
FIG. 2 is a block diagram of an exemplary hardware, software and communications environment for aggregating multiple bandwidth sources.

An exemplary hardware, software and communications environment is disclosed in FIG. 2. Hardware, software and communications environment 200 may be utilized for aggregating multiple bandwidth sources and related techniques. For example, aspects of user device 102 may be implemented using environment 200 of FIG. 2.

Computing environment 200 may comprise central processing unit (CPU) 202, aggregation module 204, system storage and memory 206, storage controller 208, and network interfaces 210. CPU 202 may comprise one or more processors, each having one or more cores. CPU 202 may be part of a system-on-a-chip (SoC)—an integrated circuit that includes multiple components of a computing device on one chip.

Aggregation module 204 may be implemented in hardware, processor-executable instructions, or a combination of hardware and processor-executable instructions. Aggregation module 204 may perform functions such as determining to utilize multiple bandwidth sources (such as Wi-Fi or cellular communication links) concurrently, selecting from among multiple bandwidth sources, prioritizing the use of each of the multiple bandwidth sources, and splitting and aggregating data that is divided among the multiple bandwidth sources. Where aggregation module 204 uses a policy (as described below) to determine how it performs these functions, this policy may be stored in policy storage 208 by aggregation module 204. In embodiments, policy storage 208 may be implemented in a similar manner as system storage and memory 206. In embodiments, aggregation module 204 may implement the operating procedures depicted in FIGS. 3-5.

System storage and memory 206 may be any computer-readable media that may store several software components including an application and/or an operating system. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media (sometimes referred to as computer-readable storage media) includes transitory and non-transitory, volatile and non-volatile, removable and non-removable media implemented in any method or technology for storage of information such as computer readable instructions, data structures, program modules, or other data. Computer storage media includes, but is not limited to, random access memory (RAM), read-only memory (ROM), electrically erasable programmable read only memory (EEPROM), flash memory or other memory technology, compact disc read only memory (CD-ROM), digital video discs (DVDs; sometimes referred to as digital versatile discs) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communications environment, user equipment device 202 may have a network interface 210. Network interface 210 may be one or more network interfaces including cellular, Ethernet, Wi-Fi, or any number of other physical and data link standard interfaces.

Aggregating Bandwidth from Multiple Sources

Figure 3:
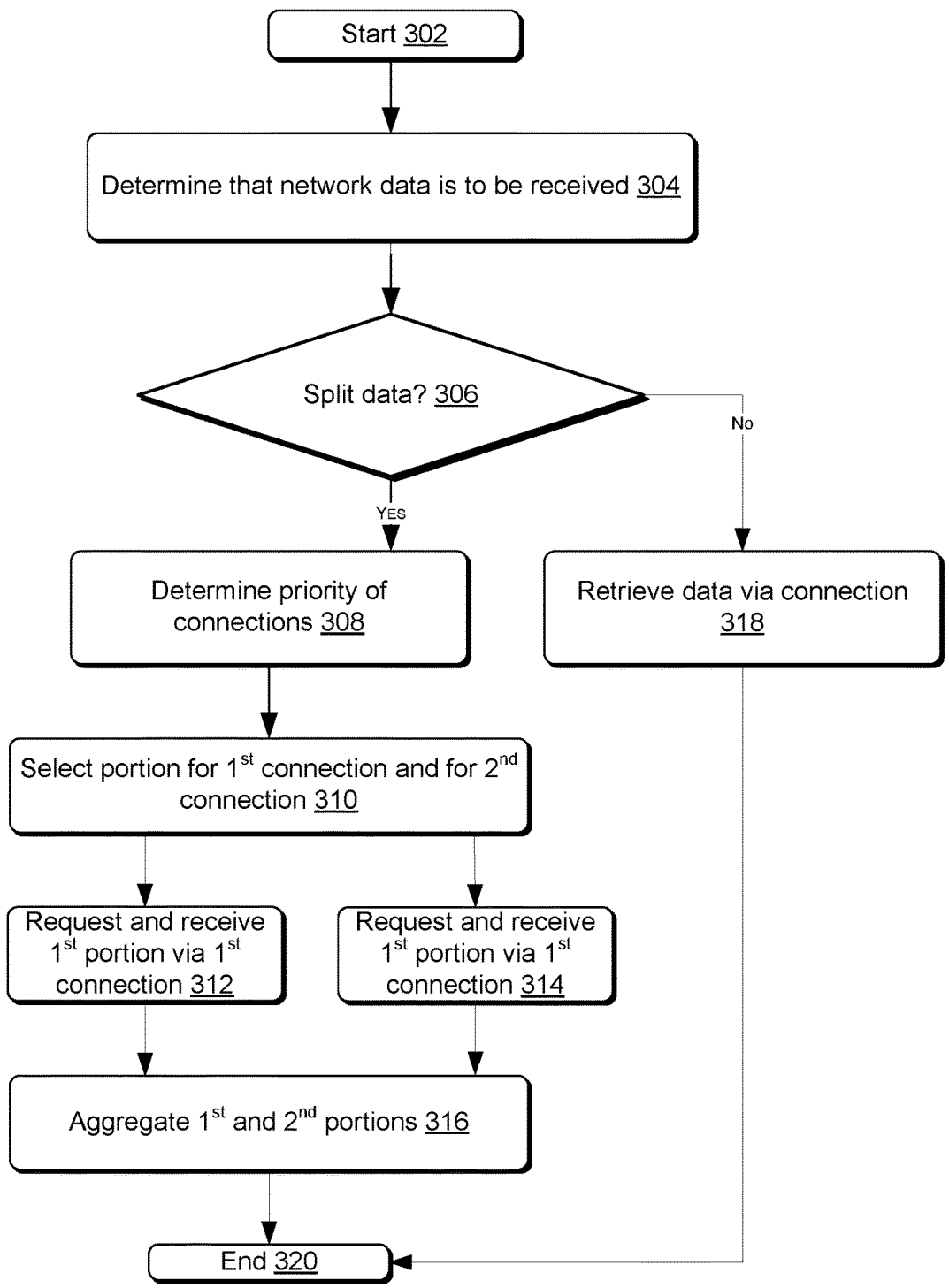
FIG. 3 depicts example operating procedures for aggregating multiple data connections to transfer data.

FIG. 3 depicts example operating procedures for aggregating multiple data connections to transfer data. In embodiments, the operating procedures of FIG. 3 may be implemented by user device 102 of FIG. 1 as it aggregates two or more of the multiple data connections, such as data connections with WAPs 104A and 104B and cellular tower 106, to transfer data. In embodiments, the operating procedures of FIG. 3 (and FIGS. 4-5) may be implemented on user device 102 in a user-mode address space that is separate from an operating system address space of the system, in an operating-system-mode address space that is separate from a user-mode address space of the system, or in a combination of the two address spaces. It may be appreciated that there may be embodiments where one or more of the operating procedures of FIGS. 3-5 may be implemented by another device or system, such as cellular network 110 of FIG. 1.

It may be appreciated that the operating procedures depicted in FIG. 3 (and FIGS. 4-5) are example operating procedures, and that there may be embodiments that implement more or fewer operating procedures than are depicted, or that implement the depicted operating procedures in a different order than is depicted. For example, there may be embodiments that aggregate three data connections, and which have an operation for requesting and receiving a portion of data via a third connection between operations 310 and 316.

The operating procedures of FIG. 3 begin with operation 302, and move to operation 304. Operation 304 depicts the user device determining that network data is to be received. This may comprise, for example, the user device receiving user input indicative of attempting to retrieve data, such as retrieve video from a remote server across the Internet. In other embodiments, an application or process of the user device may be running and attempt to retrieve data independently of receiving user input specifically requesting that data. In embodiments, this may comprise the user device determining that network data is to be retrieved. After operation 304, the operating procedures of FIG. 3 move to operation 306.

Operation 306 depicts the user device determining whether the network data is to be split among multiple data connections. In embodiments, this may comprise the user device determining whether there are multiple available connections with which to split data. For example, if the user device is currently connected to only one data connection (such as one of WAPs 104A and 104B, and cellular tower 106), or not connected to any data connections, then it may be determined in operation 306 that the network data is not to be split among multiple data connections, since there are not multiple active data connections with which to split the network data. In other embodiments, there may be multiple data connections available, but the user device may determine not to use one or more of these available data connections, such as because a monetary cost associated with using a particular data connection is above a predetermined threshold amount.

In other embodiments, determining whether to split network data depends on the amount of data to be transferred, with an amount of data below a predetermined threshold not being split. In embodiments, operation 306 may comprise the user device determining to transfer network data via a combination of a first communications channel and a second communications channel Where in operation 306 the user device determines that the network data is to be split among multiple data connections, the operating procedures of FIG. 3 move to operation 308. Instead, where in operation 306 the user device determines that the network data is not to be split among multiple data connections, the operating procedures of FIG. 3 move to operation 318.

Operation 308 is reached from operation 306 where the user device determines that the network data is to be split among multiple data connections. Operation 308 depicts the user device determining a priority of the data connections. In embodiments, there is a preference of which data connection to use relative to the other(s). For example, the cellular network's cellular data connection may be prioritized over other data connections, because the cellular network provider owns that bandwidth already, and does not have to pay another entity for that bandwidth.

In other embodiments, priority may be based on a time of day when the data transfer is occurring, or an amount of bandwidth already being used by one or more of the entities with which the user device has established a connection. Priority may also be based on data type. For example, the user device may prioritize data that is associated with a heightened level of security, such as banking data, for transfer through cellular tower 106, since cellular tower 106 may generally be considered a more secure connection than WAPs 104. Or, an enhanced 911 (E911) communication may be given a priority over other traffic and provided with as much available bandwidth as it can utilize. In embodiments, operation 308 may comprise the user device determining to prioritize using the cellular data connection over using the Wi-Fi data connection. In embodiments, operation 308 may comprise the user device prioritizing transferring the network data via the first communications channel over the second communications channel.

In embodiments, operation 308 may comprise the user device selecting the first portion of the network data based on a security level associated with the first data. It may also comprise selecting the first portion of the network data based on a data type of the first data. It may also comprise the user device selecting the first portion of the network data based on a cost associated with transferring the first data via the first communications channel or the second communications channel. It may also comprise the user device selecting the first portion of the network data based on determining that the first data is voice data. It may also comprise the user device selecting the first portion of the network data based on a geographical location of the system when the first data is to be transferred. After operation 308, the operating procedures of FIG. 3 move to operation 310.

Operation 310 depicts the user device selecting a portion of the data for a first data connection, and a portion of the data for a second data connection. For example, the first data connection may comprise the data connection with cellular tower 106 and the second data connection may comprise the data connection with WAP 104A. The portions may be selected based on the priority determined in operation 308. The portion for the second data connection may be whatever portion of the data was not selected for the first data connection. In embodiments, operation 310 may comprise the user device determining, based on determining to prioritize using the cellular data connection over using the Wi-Fi data connection, a first portion of the network data to be retrieved via the cellular data connection, and a second portion of the network data to be retrieved via the Wi-Fi data connection.

In embodiments, operation 310 may comprise the user device determining a size of the first portion of the network data such that the cellular data connection is at least at a predetermined capacity threshold. In embodiments, operation 310 may comprise the user device selecting a first portion of the network data to transfer via the first communications channel based on prioritizing transferring the network data via the first communications channel After operation 310, the operating procedures of FIG. 3 move to operations 312 and 314 in parallel.

Operation 312 depicts the user device requesting and receiving the first portion of the data via the first data connection, and is performed in parallel with operation 314. This may comprise the user device sending and/or receiving data via the first data connection according to a pre-determined protocol (e.g., Transmission Control Protocol/Internet Protocol—TCP/IP—over a 802.11 standard protocol for wireless communications). In embodiments, operation 312 may comprise the user device requesting and receiving a first portion of the network data via the cellular data connection. In embodiments, operation 312 may comprise the user device transferring the first portion of the network data via the first communications channel.

In embodiments, the user device may adjust the priority for the first and second communications channels while a transfer occurs. In embodiments this may comprise, while the user device transfers the first portion of the network data via the first communications channel, the user device determining a change to prioritizing transferring the network data via the first communications channel over the second communications channel, and adjusting an amount of the network data to transfer via the first communications channel After operation 312, the operating procedures of FIG. 3 move to operation 316.

Operation 314 depicts requesting and receiving the second portion of the data via the second data connection, and is may be performed in parallel with operation 312. Operation 314 may be implemented in a similar manner as operation 312. In embodiments, operation 314 may comprise the user device requesting and receiving a second portion of the network data via the cellular data connection while requesting and receiving the first portion of the network data. In embodiments, operation 314 may comprise the user device transferring a second portion of the network data via the second communications channel while transferring the first portion of the network data via the first communications channel. In embodiments where the second communications channel is a Wi-Fi communications channel, operation 314 may comprise the user device establishing a virtual private network (VPN) connection on the second communications channel, and transferring the second portion of the network data via the VPN connection. After operation 314, the operating procedures of FIG. 3 move to operation 316.

Operation 316 is reached from both operations 312 and 314, which may occur in parallel, and depicts the user device aggregating the first and second portions of the data. This may comprise, for example, the user device ordering the two data streams into one data stream. For example, the data collectively received may represent a web page with two videos, and the user device may request one video and the web page itself from one data connection, and the user device may request the other video from the other data connection. In this scenario, the user device aggregating the first and second portions of the data may comprise the user device rendering the web page in a web browser, including the two videos, as if all of the data had been requested and received from a single data connection. In embodiments, operation 316 may comprise the user device aggregating the first portion of the network data and the second portion of the network data into the network data, and storing the network data in a memory. After operation 316, the operating procedures of FIG. 3 move to operation 320, where the operating procedures of FIG. 3 end.

Operation 318 is reached from operation 306 where it is determined in operation 306 that the network data is not to be split among multiple data connections. Operation 318 depicts the user device retrieving the data via a single connection. In embodiments, this may comprise the user device utilizing just one data connection—e.g., the data connection with cellular tower 106 to transmit all requested data. After operation 318, the operating procedures of FIG. 3 move to operation 320, where the operating procedures of FIG. 3 end.

Selecting Among Multiple Possible Connections

Figure 4:
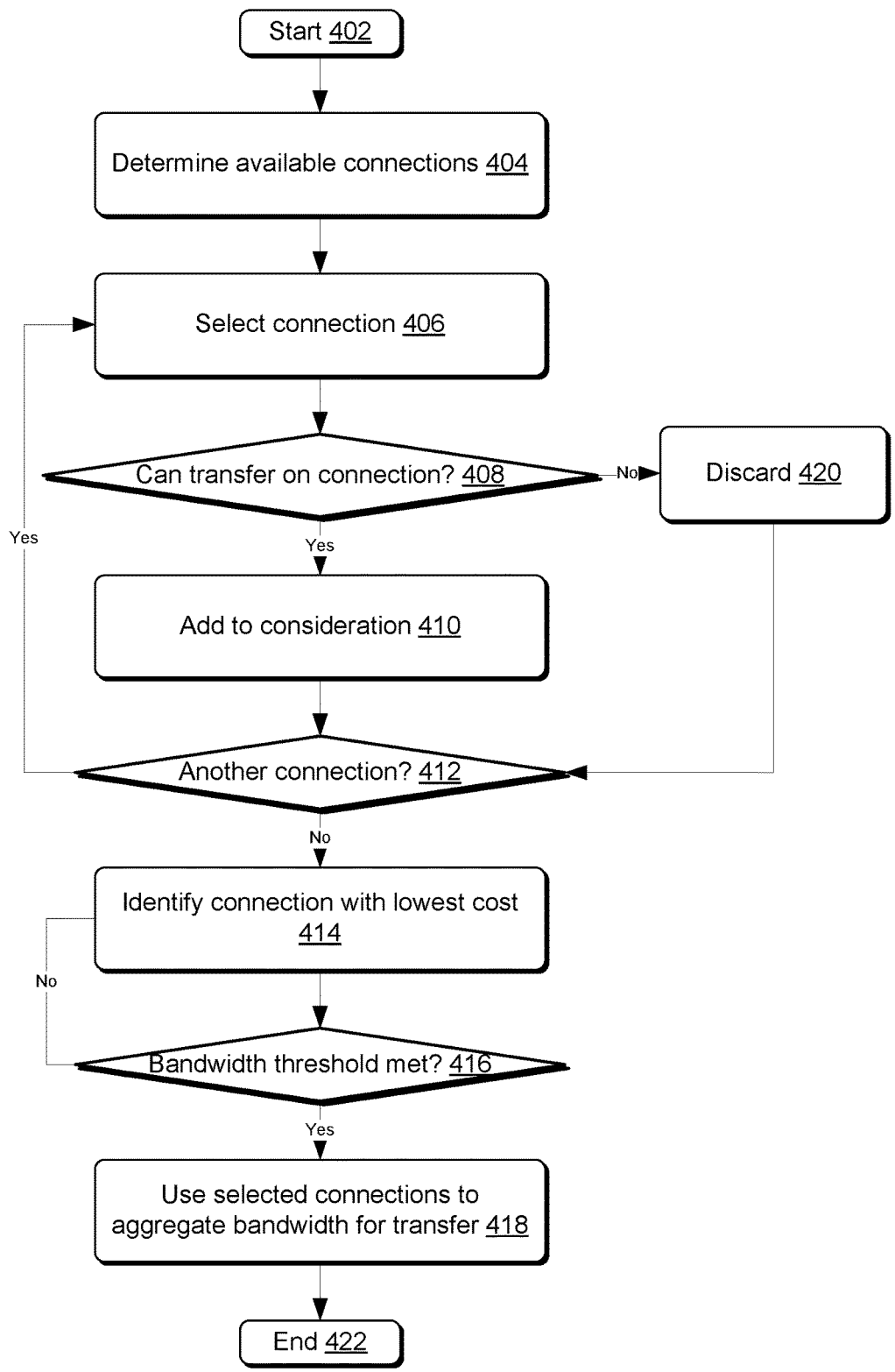
FIG. 4 depicts example operating procedures for selecting connections to use to aggregate data from among a plurality of available connections.

FIG. 4 depicts example operating procedures for selecting connections to use to aggregate data from among a plurality of available connections. In embodiments the operating procedures of FIG. 4 may be implemented by user device 102 of FIG. 1 as it aggregates two or more of the multiple data connections from WAPs 104A and 104B, and cellular tower 106, to transfer data. The operating procedures of FIG. 4 may be implemented in conjunction with the operating procedures of FIG. 3 to determine the first and second connections that are going to be used in the operating procedures of FIG. 3. That is, the operating procedures of FIG. 4 may be used instead of, or to augment, operating procedures 308-316 of FIG. 3.

The operating procedures of FIG. 4 begin with operation 402, and move to operation 404. Operation 404 depicts the user device determining the available connections. This may comprise the user device determining whether the user device can authenticate (if authentication is necessary) and connect to each of those networks (or whether such authentication and connection has already occurred and is currently active) for example, for each network that is detectable by the user device. After operation 404, the operating procedures of FIG. 4 move to operation 406.

Operation 406 depicts the user device selecting a connection from the available connections. Operation 406 is reached from operation 404, or from operation 412 where it is determined that there is another connection to be considered. This may comprise, for example, the user device maintaining a list of these available connections determined in operation 404, and selecting one such connection from the list that has not already been considered in operation 408 during the current instance of implementing the operating procedures of FIG. 4. After operation 406, the operating procedures of FIG. 4 move to operation 408.

Operation 408 depicts the user device determining whether data can be transferred on the selected connection. This may comprise, for example, the user device determining whether the selected connection can currently be used to access the Internet 108. For example, it may be that user device 102 has an active data connection with WAP 104A, but that WAP 104A has lost its connection with Internet 108. So, while user device 102 has an active data connection with WAP 104A, that connection may not be helpful in transmitting data across Internet 108. Whether a given connection is active through the Internet 108 may comprise the user device sending a ping packet to a known IP address accessible via Internet 108, and determining that a corresponding acknowledgement (ACK) packet has been received.

Figure 5:
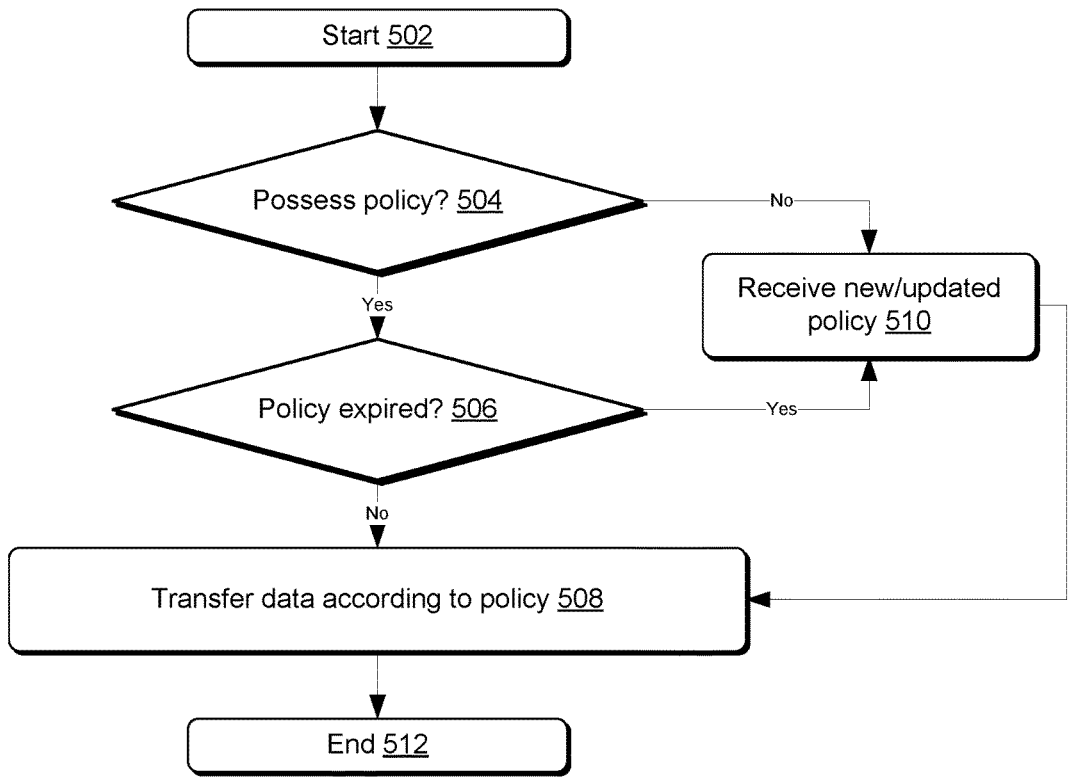
FIG. 5 depicts example operating procedures for determining a policy by which to select and prioritize data connections for use in aggregating data.

In other embodiments, there may be a policy (as described in more detail with respect to the operating procedures of FIG. 5) that indicates to the user device whether given data connections are to be used, or given time periods where they may be used. Where in operation 408 the user device determines that data can be transferred on the selected connection, the operating procedures of FIG. 4 move to operation 410. Instead, where in operation 408 the user device determines that data cannot be transferred on the selected connection, the operating procedures of FIG. 4 move to operation 420.

Operation 410 is reached from operation 408 where the user device determines that data can be transferred on the selected connection. Operation 410 depicts the user device adding the selected connection to a list for further consideration. This may be a list maintained in a memory of the user device. After operation 410, the operating procedures of FIG. 4 move to operation 412.

Operation 412 depicts the user device determining whether there is another connection to be considered from the available connections that were determined in operation 404. This may comprise the user device determining whether each connection in the list of operation 404 has been analyzed in operation 408. Operation 412 may be reached from operation 410 or from operation 420. Where in operation 412 the user device determines that there is another connection to be considered, the operating procedures of FIG. 4 return to operation 406. Instead, where the user device determines that there is not another connection to be considered, the operating procedures of FIG. 4 move to operation 414.

Operation 414 is reached from operation 412 where the user device determines in operation 412 that there is not another connection to be considered, or from operation 416 where the user device determines that the bandwidth threshold of that operation has not been met. Operation 414 depicts the user device identifying a considered connection with the lowest associated cost. In embodiments where data aggregation is performed as a service provided by cellular network 110, it may be that a data connection with cellular tower 106 is considered to have no cost. Or, if there is a cellular data transfer allowance (such as per month) for a user device, then this may comprise the user device determining whether this allowance has been used up, and what a monetary cost for going above the cap may be. Where a WAP data connection is being considered, this may comprise the user device consulting its policy to determine a monetary cost associated with transferring data on that particular data connection.

In embodiments, operation 414 may comprise the user device selecting a second communications channel from a plurality of communications channels based on a monetary cost of transferring data via the second communications channel being the lowest of the plurality of communications channels. After operation 414, the operating procedures of FIG. 4 move to operation 416.

Operation 416 depicts the user device determining whether a bandwidth threshold has been reached from among the chosen connections. That is, the user device may be promised a threshold amount of bandwidth—e.g., at least 10 Mbps. Where any single data connection does not provide that threshold amount of bandwidth (e.g., a data connection with cellular tower 106 may be 7 Mbps, and a data connection with each WAP 104 may be 2 Mbps), it may be that the user device selects additional data connections to use, based on a priority of using those connections, until that threshold amount of bandwidth is reached. Where in operation 414 the user device determines that the bandwidth threshold has been met, the operating procedures of FIG. 4 move to operation 418. Instead, where in operation 414 the user device determines that the bandwidth threshold has not been met, the operating procedures of FIG. 4 return to operation 414.

Operation 418 is reached from operation 414 where the user device determines that the bandwidth threshold has been met. Operation 418 depicts the user device using the selected connections to aggregate data for the transfer. In embodiments, the user device may implement operation 418 in a similar manner as operations 308-316 of FIG. 3. After operation 418, the operating procedures of FIG. 4 move to operation 422, where the operating procedures of FIG. 4 end.

Operation 420 is reached from operation 408 where the user device determines that data cannot be transferred on the selected connection. Operation 408 depicts the user device discarding the selected connection from further consideration for use. This may comprise the user device determining not to use the selected connection for aggregating bandwidth. After operation 420, the operating procedures of FIG. 4 move to operation 412.

Determining a Policy for Aggregating Bandwidth

FIG. 5 depicts example operating procedures for determining a policy by which to select and prioritize data connections for use in aggregating data. In embodiments, the operating procedures of FIG. 5 may be implemented by user device 102 of FIG. 1. In embodiments, the operating procedures of FIG. 5 may be implemented to determine a priority of connections to be used as depicted in operation 308 of FIG. 3.

The operating procedures of FIG. 5 begin with operation 502, and then move to operation 504. Operation 504 depicts the user device determining whether a policy is possessed. This may comprise the user device searching for a file representing the policy in a known location in a file system locally stored by the user device, or the user device searching for the policy in a known location of a memory of the user device. Where in operation 504 the user device determines that a policy is possessed, the operating procedures of FIG. 5 move to operation 506. Instead, where in operation 506 the user device determines that a policy is not possessed, the operating procedures of FIG. 5 move to operation 510.

Operation 506 is reached from operation 504 where the user device determines that a policy is possessed. Operation 506 depicts the user device determining whether the policy is expired. This may comprise, for example, the user device checking whether a time stamp associated with the policy stored by the user device is older than a predetermined maximum threshold amount of time. Where in operation 506 the user device determines that the policy is expired, the operating procedures of FIG. 5 move to operation 510. Instead, where in operation 506 the user device determines that the policy is not expired, the operating procedures of FIG. 5 move to operation 508.

Operation 508 is reached from operation 506 where the user device determines that the policy is not expired, or from operation 510. Operation 508 depicts the user device transferring data according to the policy. This may comprise, for example, the user device prioritizing a particular data connection over another data connection; the user device using a particular data connection only during a predetermined time block; the user device prioritizing data based on its type, such as a security level associated with the data; or the user device attempting to deliver at least a threshold amount of bandwidth among one or more aggregated data connections. In embodiments, operation 508 may comprise the user device selecting the first portion of the network data based on a policy received from a remote computing device. After operation 508, the operating procedures of FIG. 5 move to operation 512, where the operating procedures of FIG. 5 end.

Operation 510 is reached from operation 504 where the user device determines that a policy is not possessed, or from operation 506 where the user device determines that the policy is expired. Operation 510 depicts the user device receiving a new or updated policy. This may comprise, for example, the user device requesting a new or updated policy from cellular network 110 (sometimes referred to as pulling the data policy). In embodiments, pulling the data policy may comprise the user device receiving the policy in response to requesting the policy from the remote computing device. It may also comprise, for example, cellular network 110 sending the user device a new or updated policy without having received a request to do so from the user device (sometimes referred to as pushing the data policy). In embodiments, pushing the data policy may comprise the user device receiving the policy from the remote computing device independent of requesting the policy from the remote computing device. In embodiments, the policy may be transferred by being embedded in a control signal packet received via a cellular network communications channel After operation 510, the operating procedures of FIG. 5 move to operation 508 (and after operation 508, the operating procedures of FIG. 5 end).

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   receiving, at a user device, a policy for routing network data from a network to the user device via one or more data connections, the policy at least prioritizing using a cellular data connection over a Wi-Fi data connection for enhanced 911 (E911) communication;
   determining, by the user device, that network data to be retrieved from the network is to be split over multiple data connections that include the cellular data connection and the Wi-Fi data connection based on the policy;
   determining, by the user device, a first portion of the network data to be retrieved via the cellular data connection, and a second portion of the network data to be retrieved via the Wi-Fi data connection;
   receiving, by the user device, the first portion of the network data via the cellular data connection, the first portion of the network data including the E911 communication; and
   while receiving the first portion of the network data, receiving, by the user device, the second portion of the network data via the Wi-Fi data connection, the second portion of the network data including communications other than the E911 communication.

2. The computer-implemented method of claim 1, wherein a combination of the cellular data connection and the Wi-Fi data connection provides a threshold amount of bandwidth to the user device.

3. A user device, comprising:
   at least one processor; and
   at least one memory communicatively coupled to the at least one processor when the user device is operational, the at least one memory bearing processor-executable instructions that, upon execution by the at least one processor, cause the user device to perform actions comprising:
   receiving a policy for routing network data from a network to the user device via one or more data connections, the policy at least prioritizing using a first communications channel over a second communication channel for enhanced 911 (E911) communication;
   determining that network data to be retrieved from the network is to be split concurrently over multiple communications channels based on the policy, the multiple communications channels including a combination of the first communications channel and the second communications channel;
   selecting a first portion of the network data to retrieve from the network via the first communications channel that is prioritized over the second communications channel, the first portion of the network data including the E911 communication;
   retrieving the first portion of the network data via the first communications channel; and
   while retrieving the first portion of the network data via the first communications channel, retrieving a second portion of the network data via the second communications channel, the second portion of the network data including communications other than the E911 communication.

4. The user device of claim 3, further comprising selecting the second portion of the network data to retrieve via the second communications channel based on a security level associated with the second portion of the network data.

5. The user device of claim 3, further comprising selecting the second portion of the network data to retrieve via the second communications channel based on a time of day at which the second portion of the network data is to be retrieved.

6. The user device of claim 3, wherein the first communications channel comprises a cellular communications channel, and the second communications channel comprises a Wi-Fi communications channel.

7. The user device of claim 3, further comprising selecting the second portion of the network data to retrieve via the second communications channel based on a cost associated with retrieving the second portion of the network data via the first communications channel or the second communications channel.

8. The user device of claim 3, wherein a combination of the first communications channel and the second communications channel provides a threshold amount of bandwidth to the user device.

9. The user device of claim 3, further comprising selecting the second portion of the network data to retrieve via the second communications channel based on a geographical location of the user device.

10. The user device of claim 3, wherein at least a portion of the processor-executable instructions are executed in a user-mode address space that is separate from an operating system address space of the system.

11. The user device of claim 3, wherein at least a portion of the processor-executable instructions are executed in an operating-system-mode address space that is separate from a user-mode address space of the system.

12. A non-transitory computer-readable storage medium of a user device, bearing computer-executable instructions that, when executed cause the user device to perform operations comprising:
    determining to transfer network data via a combination of a first communications channel and a second communications channel;
    selecting a first portion of the network data to transfer via the first communications channel and selecting a second portion of the network data to transfer via the second communication channel based on a policy received from a remote computing device of a network, the policy at least prioritizing using the first communications channel over the second communications channel for enhanced 911 (E911) communication;
    transferring the first portion of the network data via the first communications channel, the first portion of the network data including the E911 communication; and
    while transferring the first portion of the network data via the first communications channel, transferring a second portion of the network data via the second communications channel, the second portion of the network data including communications other than the E911 communication.

13. The non-transitory computer-readable storage medium of claim 12, wherein the policy is embedded in a control signal packet received at the user device from the remote computing device.

14. The non-transitory computer-readable storage medium of claim 13, wherein the operations further comprise receiving the policy in response to requesting the policy from the remote computing device.

15. The non-transitory computer-readable storage medium of claim 13, wherein the operations further comprise receiving the policy from the remote computing device independent of requesting the policy from the remote computing device.

16. The non-transitory computer-readable storage medium of claim 13, wherein transferring the second portion of the network data includes transferring the second portion of the network data via the second communications channel based on the policy.

17. The non-transitory computer-readable storage medium of claim 12, wherein the second communications channel comprises a Wi-Fi communications channel, and wherein transferring the second portion of the network data via the second communications channel further comprises:
    establishing a virtual private network (VPN) connection on the second communications channel, and transferring the second portion of the network data via the VPN connection.

18. The non-transitory computer-readable storage medium of claim 12, wherein the operations further comprise:
    selecting the second communications channel from a plurality of communications channels based on a monetary cost of transferring data via the second communications channel being lowest of the plurality of communications channels.

19. The non-transitory computer-readable storage medium of claim 12, wherein the first communications channel comprises a cellular communications channel, and the second communications channel comprises a Wi-Fi communications channel.

20. The non-transitory computer-readable storage medium of claim 12, wherein a combination of the first communications channel and the second communications channel provides a threshold amount of bandwidth to the user device.

* * * * *